July 11, 1967

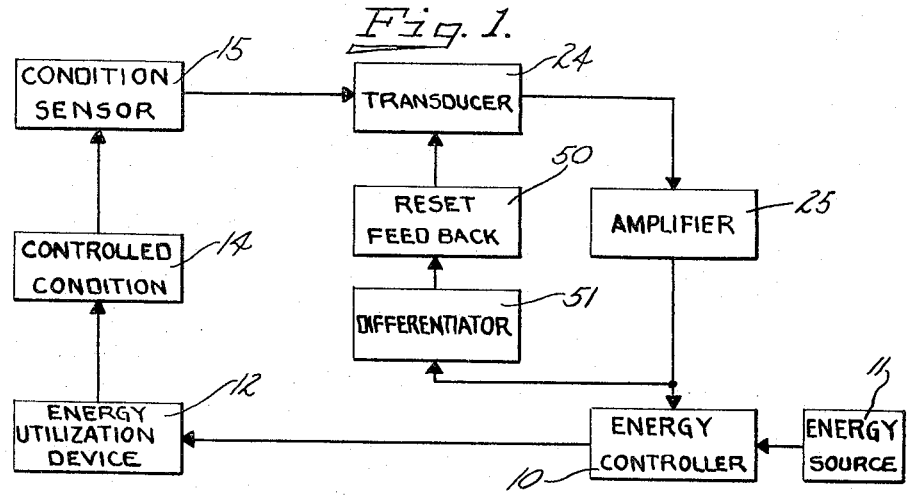
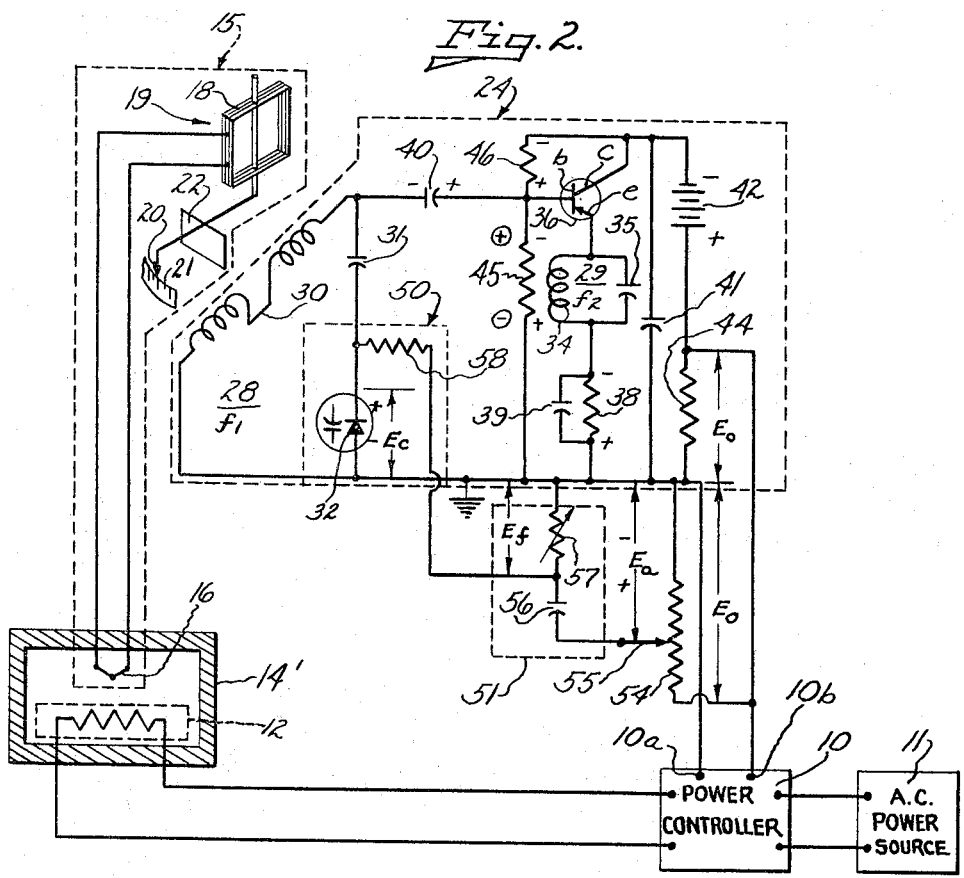

D. G. EKSTEN 3,331,016

OSCILLATOR CONTROLLER WITH RESET OR RATE ACTION

Filed May 8, 1964

INVENTOR.
DENNIS G. EKSTEN
BY
Wolfe, Hubbard, Voit & Osann
ATTORNEYS

INVENTOR.
DENNIS G. EKSTEN
BY
Wolfe, Hubbard, Voit & Osann
ATTORNEYS

INVENTOR.
DENNIS G. EKSTEN

United States Patent Office

3,331,016
Patented July 11, 1967

3,331,016
OSCILLATOR CONTROLLER WITH RESET OR
RATE ACTION
Dennis G. Eksten, Loves Park, Ill., assignor to Barber-Colman Company, Rockford, Ill., a corporation of Illinois
Filed May 8, 1964, Ser. No. 366,026
6 Claims. (Cl. 323—66)

The present invention relates in general to automatic control systems for maintaining a variable condition at a desired or "set point" value. More particularly, the invention is concerned with control systems having continuous corrective action produced by proportional plus either or both reset and rate responses.

It is the general aim of the invention to provide a proportional controller with reset or rate action, or both and which is characterized by extreme simplicity, low cost, compact size, and reliable operation.

More particularly, it is an object to provide such a controller in which the reset or rate action is accomplished in a very simple and effective way, e.g., by varying the value of a controllable impedance device according to a derivative or integral feedback signal, and thereby to alter the output signal of the controller.

A further object is to provide such a controller in which either the proportional band, the reset rate or the rate gain may be readily and independently adjusted by changing the settings of simple and inexpensive components, for example potentiometers or rheostats.

Other objects and advantages of the invention will become apparent as the following description proceeds, taken in conjunction with the accompanying drawings, in which:

FIGURE 1 is a block diagram illustrating in general form a continuous action, proportional-reset automatic control system;

FIG. 2 is a partially diagrammatic, partially schematic illustration of a control system of the type shown in FIG. 1, but illustrating a specific, exemplary embodiment of the present invention;

Figure 7:
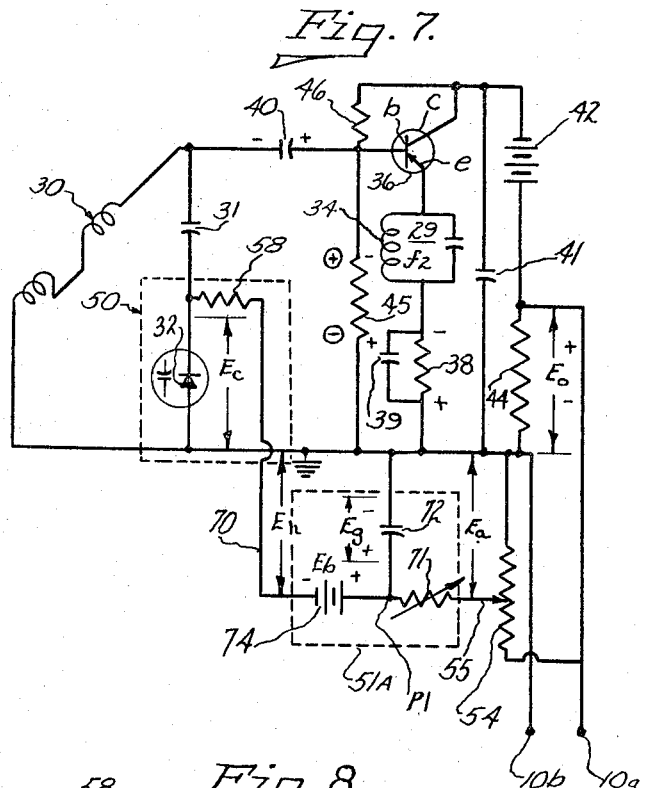
Figure 8:
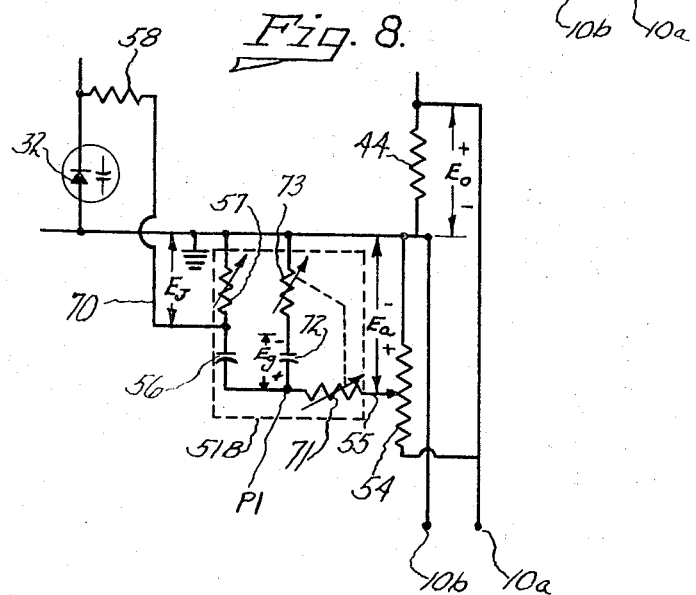

FIG. 7 corresponds to a portion of FIG. 2 but illustrates a modification to provide proportional plus rate action; and FIG. 8 is a fragmentary schematic diagram illustrating modification in the circuit of FIG. 7 to obtain proportional plus reset and rate action.

While the invention has been shown and will be described in some detail with reference to particular embodiments thereof, there is no intention that it thus be limited to such detail. On the contrary, it is intended here to cover all alternatives, modifications and equivalents falling within the spirit and scope of the invention as defined by the appended claims.

Referring now to FIG. 1, the system there shown includes a final energy controller 10 which regulates the rate at which energy is supplied from an energy source 11 to an energy utilization device 12, the latter in turn increasing or decreasing the value of a controlled condition 14 according to the rate at which the utilization device receives energy. In general, it may be assumed that the energy controller 10 transmits energy to the utilization device 12 at a rate which varies with the magnitude of an amplified output signal supplied thereto.

In the more specific example of FIG. 2, the energy controller 10 is shown as an electrical power controller, the energy source 11 is shown as an A.C. power source (e.g., 220 volt A.C. supply mains), and the energy utilization device 12 is shown as an electric heater disposed in a furnace 14', the temperature of the latter being the variable condition which is to be controlled. The power controller 10 may take any of a variety of forms familiar to those skilled in the art; for example, it may be a silicon controlled rectifier circuit, a saturable reactor, or a magnetic amplifier, which transmits electrical energy to the heater 12 at a rate generally proportional to an output signal $E_o$ applied to its control terminals 10a and 10b.

In order to maintain the variable condition at a desired value, a condition sensor 15 is employed to produce a signal or manifestation indicative of the actual value of the controlled condition 14. As here shown in FIG. 2, the condition sensor 15 is constituted by a thermocouple 16 disposed in the furnace 14' and electrically connected to the moving coil 18 of a sensitive meter 19. This meter may for example be a D'Arsonval moving coil galvanometer which is only here partially shown as including a pointer 20 movable with the pivoted coil 18 along a scale 21 which may be calibrated either in millivolts or degrees of temperature. The thermocouple 16 produces a voltage proportional to the actual value of the sensed temperature in the furnace, so that the position of the pointer 20 (and that of a metal vane 22 carried thereby) thus represents the actual value of the temperature in the furnace 14'.

To effect corrective changes in the rate of energy supplied to the heater 12 and thus in the furnace temperature, the system as shown in FIG. 1 includes a transducer 24 responsive to the condition sensor 15 and constituting means for producing an output signal which is normally varied in proportion to changes in the error between (1) the sensed actual value of furnace temperature, and (2) a desired or "set point" value of temperature. The output signal is supplied from the transducer 24 through an amplifier 25 and thence to the control input of the energy controller 10.

As shown in greater detail by FIG. 2, the transducer takes the form of an oscillator which includes detector and reference parallel resonant circuits or "tanks" 28 and 29 having resonant frequencies $f_1$ and $f_2$. The operation of the oscillator 24 will be described more fully below, but for the present it will suffice simply to indicate that it produces an output signal in the form of a D.C. voltage $E_o$ which varies inversely according to changes in the resonant frequency $f_1$ of the detector tank circuit 28. It will be seen from FIG. 2 that the output signal $E_o$ is supplied to the control terminals 10a, 10b of the power controller 10, the optional amplifier 25 shown in FIG. 1 being omitted for the sake of simplicity from the illustration of FIG. 2.

The detector tank 28 comprises an inductive coil 30 connected in parallel with the series combination of a capacitor 31 and a voltage-controlled variable capacity diode 32. This latter capacitor-diode will be described more fully below, and for the present it will suffice to assume simply that it behaves as a capacitor, so that the parallel combination of the coil 30 and the capacitors 31, 32 forms an LC parallel circuit which exhibits a resonant frequency according to the well known relationship $$\text{Resonant frequency} = f_r = \frac{1}{2\pi\sqrt{LC}}$$

To vary the D.C. voltage $E_o$ according to changes in the error between the actual and desired values of furnace temperature, the coil 30 is formed in two spaced sections and disposed along the path of the flag 22 so that the latter progressively enters between them as the furnace temperature rises. When the flag 22 is down-scale and free of the coil 30, the latter exhibits its maximum inductance, and the resonant frequency $f_1$ of the tank 28 has its lowest value. As the flag 22 (made of a non-magnetic, conductive metal such as aluminum) progressively enters between the coil sections, it progressively reduces the mutual coupling therebetween, thus reduces the inductance of coil 30, and increases the resonant frequency $f_1$. It will become apparent that when the resonant frequency $f_1$ has its lowest value, the D.C. voltage $E_o$ has its highest value, and as the resonant frequency $f_1$ progressively increases, the output voltage $E_o$ proportionally decreases.

The set point value of temperature may be adjusted by setting the coil 30 to different positions along the path of the flag 22 by any suitable mechanism (not shown). The error between the set point and the sensed furnace temperature is thus represented by the difference between the adjusted coil position and the flag position, the inductance of coil 30 decreasing (and the resonant frequency $f_1$ increasing so that the voltage $E_o$ decreases) as the error decreases. In this way, the D.C. signal $E_o$ is caused normally to vary in proportion to the temperature error, although this relationship is bounded when the flag is completely out of or fully inserted between the coil sections.

At this point it will be helpful to explain more fully the organization and operation of the oscillator 24. The reference tank 29 is formed by an inductive coil 34 connected in parallel with a capacitor 35 and so chosen in magnitude that the resonant frequency $f_2$ is greater than the resonant frequency $f_1$ when the flag 22 is free of the coil 30. It will be seen that the detector tank 28 and the reference tank 29 are, in effect, connected in series with the emitter $e$ and base $b$ of a high frequency amplifying PNP transistor 36. The complete series circuit includes a connection from a point of reference potential, here shown as ground, through a biasing resistor 38 (paralleled by a capacitor 39 which serves as a high frequency shunt so that it is in effect a zero impedance for high frequency oscillations) and the reference tank 29 to the emitter $e$; and a connection from the base $b$ through a D.C. blocking capacitor 40 (which appears as a negligible impedance to high frequncy oscillations) and the detector tank 28 back to ground. The reference tank 29 is common to the input and output circuits of the transistor 36. That output circuit includes the biasing resistor 38 paralleled by the capacitor 39, the reference tank 29, the emitter $e$ and collector $c$ of the transistor, and a bypass condenser 41 which parallels the series combination of a suitable voltage source (here shown as a battery 42) and a load resistor 44. Because the reference tank 29 is common to the emitter-base and emitter-collector circuits, there is positive feedback coupling which will sustain oscillations at a relatively high frequency when the D.C. bias making the emitter positive with respect to the base is sufficiently great to make the transistor conductive.

It may be assumed that insofar as D.C. voltage and current are concerned, the emitter-base circuit of the transistor is constituted by the biasing resistor 38 and a resistor 45 connected between the base $b$ and ground. The resistor 45 together with another resistor 46 form a voltage divider connected between the negative terminal of the battery 42 and ground, and normally producing voltage drops indicated by the uncircled polarity signs. The charge on the blocking capacitor 40 affects current flow through the resistor 45 and the voltage drop thereacross, and thus affects the forward bias of the emitter-base junction. As the voltage on capacitor 40 increases, its discharges through the resistor 45 creating a component of voltage drop represented by the circled polarity signs, thereby making the base $b$ less negative and reducing the D.C. bias on the transistor.

In the emitter-collector circuit, D.C. current flows from the battery 42 through the load resistor 44, thence through the biasing resistor 38 to produce a voltage drop of the indicated polarity, thence through the reference tank 29 (which appears as a negligible resistance) to the emitter $e$ and thence to the collector $c$. The bypass condenser 41 prevents high frequency oscillations from appearing across the load resistor 44, so that the output voltage $E_o$ is substantially pure D.C.

When the oscillator is first put in operation, voltage drops of the polarity indicated by uncircled signs occur across the resistors 46 and 45, thereby making the base $b$ negative with respect to the emitter $e$ and causing the transistor 36 to be turned "on." When the transistor thus conducts, high frequency oscillations begin and are sustained by the feedback coupling between the detector and reference tanks 28 and 29.

When these oscillations occur, partial rectification at the emitter-base junction results in the blocking capacitor 40 being charged with the indicated polarity. This voltage on the capacitor tends to make the base $b$ less negative, to reduce the emitter-base current, and to thus reduce the D.C. current flow through the collector circuit of the transistor and the load resistor 44. In general, the voltage on the blocking capacitor 40 depends upon the strength or amplitude of the high frequency oscillations which are so rectified at the emitter-base junction. The voltage on the capacitor 40, in turn, determines the magnitude of the D.C. output voltage $E_o$. Thus, the D.C. voltage $E_o$ is inversely related to the amplitude or strength of high frequency oscillations.

The present oscillator is one which operates with time-spaced pulses of oscillations, although this is not essential. The controlling bias voltage across the emitter-base junction of the transistor 36 is constituted by the algebraic sum of the voltage drops across the resistors 38 and 45. As oscillations begin, the blocking capacitor 40 charges with a low time constant by emitter-base rectification, and discharges more slowly or with a higher time constant by current flow through the resistor 45 to produce that component of voltage drop represented by the circled polarity signs. Thus, the capacitor 40 will charge relatively quickly, depending upon the amplitude of oscillations, to a voltage which reduces the R.F. gain of the transistor to a point at which oscillations cease. Then, when the capacitor 40 has discharged sufficiently, the R.F. gain again increases, and oscillations are resumed. A similar effect is produced by the biasing resistor 38 since as the D.C. current increases the voltage drop thereacross increases and tends to make the emitter negative relative to the base. The intermittent or time spaced pulses of oscillations is called "squegging." It does not, however, directly affect the D.C. output voltage $E_o$ because both the oscillation frequencies and the "squegging" frequencies are bypassed by the capacitor 41. For purposes of discussion, therefore, it may be considered that the D.C. output voltage $E_o$ is inversely proportional to the average voltage across the blocking capacitor 40, and thus to the amplitude of the oscillations which occur in time-spaced pulses.

The oscillator 24 oscillates at an operating frequency $f_0$ which is intermediate and substantially midway between the parallel resonant frequencies $f_1$ and $f_2$ of the detector and reference tanks 28 and 29. By way of example, if the resonant frequencies $f_1$ and $f_2$ are 26.5 and 27.5 mc. then the oscillation frequency $f_0$ will be approximately 27.0 mc. The amplitude of oscillations depends, however, upon the relative magnitudes of the net reactances of the two tank circuits 28, 29 at the operating frequency $f_0$. The resonant frequencies $f_1$ and $f_2$ are chosen so that the latter is greater than the former, and so that the operating frequency $f_0$ is greater than $f_1$ but less than $f_2$. Therefore, the net reactance $X_1$ of the detector tank 28 appears capacitive, and the net reactance $X_2$ of the reference tank appears inductive. The strength of the oscillations increases as the magnitude of $-X_1$ approaches that of $+X_2$, and becomes a maximum when the two are equal so that the two tanks become series resonant in the emitter-base circuit.

The operation of the oscillator 24 will be described in more detail below, but for the present it may be understood that when the actual furnace temperature is considerably below the set point value, the resonant frequency $f_1$ will be considerably below the reference frequency $f_2$, the oscillator will be operative with relatively low amplitude oscillations, the charge on the capacitor 40 will be relatively small, and thus the output signal $E_o$ will be relatively high. If the furnace temperature now rises so that the flag moves to the right and the error is reduced, movement of the flag further into the coil 30 will reduce the inductance of the latter and increase the resonant frequency $f_1$ so that it more closely approaches the reference frequency $f_2$. As a result, the operating frequency of the oscillator will change, but more importantly the amplitude of oscillations will increase so that the voltage on the capacitor 40 will increase. This, in turn, makes the base $b$ less negative and reduces the D.C. current flowing through and the voltage $E_o$ across the load resistor 44. Thus, the output voltage $E_o$ will vary in proportion to the temperature error.

When the output voltage $E_o$ increases or decreases, the power controller 10 passes a greater or lesser current to the heater 12, and thus increases or decreases the rate at which heat energy is created in the furnace 14'. The temperature within the furnace will thus be increased or decreased and will affect the position of the flag 22 to further exert a corrective action on the output signal $E_o$.

As indicated in FIG. 1, the system includes a reset feedback element 50 exerting an influence on the transducer 24 to affect the output signal thereof, and controlled by a differentiator 51 which receives the output signal as its input. Although the differentiator 51 is shown in FIG. 1 as receiving the output signal after amplication by the amplifier 25, the latter has for purposes of simplicity been omitted from FIG. 2.

In accordance with the present invention, reset operation is accomplished by including in the transducer 24 a voltage-controlled variable impedance together with means responsive to the impedance value thereof for affecting the output signal $E_o$. In the present instance, reset feedback device 50 is constituted by a voltage-controlled variable impedance which takes the form of the semiconductor junction diode 32 of the type which, as mentioned above, exhibits a substantial electrical capacitance between its opposite electrodes. Such capacitor-diodes are available commercially and are known to possess a capacitance which varies according to an inverse, nonlinear function of a reversely biasing D.C. control voltage applied thereto. It may be generally considered, by way of example, that the capacitance value of the diode 32 varies in proportion to the value of the control voltage raised to a negative exponent. To make the capacitance value of the diode 32 affect the output signal $E_o$ (in addition to the effect produced by the movements of the flag 22), the diode 32 is connected in one of the resonant circuits of the oscillator thereby to vary the relationship of the resonant frequencies $f_1$ and $f_2$. In the present instance, the diode 32 forms a part of the detector tank 28, and indeed together with the capacitor 31 forms the capacitance which is parallel with the inductive coil 30. If it is assumed that the flag 22 remains stationary, then as a D.C. control voltage $E_c$ applied with the indicated polarity across the diode increases or decreases, then the value of the diode capacitance decreases or increases to thus increase or decrease the resonant frequency $f_1$.

The capacitor 31 serves to isolate the D.C. control voltage $E_c$ from the remainder of the circuit. It is found that during operation of the oscillator a steady state component of the control voltage $E_c$ is created across the diode 32, this component being, for example, about two volts and remaining constant (in the absence of feedback to be described) despite variations of the flag position and of oscillation amplitude. If the control voltage is increased above or decreased below its normal value, then the capacitance of the diode decreases or increases, and thus increases or decreases the resonant frequency $f_1$. Such increase or decrease in the frequency $f_1$, with the resonant frequency $f_2$ remaining constant, causes corresponding decreases or increases in the output voltage $E_o$, as generally explained above.

Further in carrying out the invention, provision is made to apply across the variable capacitance diode 32 a control voltage which varies as a time derivative function of the output signal, so that the latter must change according to the time integral of the temperature error, thereby to achieve reset action. At the same time, facility for adjustment of either the proportional band or the reset rate of the system is made possible in a very simple and economical manner.

In the exemplary embodiment of FIG. 2, this is accomplished by means to develop an auxiliary signal which is an adjustable fraction of the output signal, such means here being shown as a potentiometer 54 energized with the output voltage $E_o$ so that an adjustable auxiliary voltage $E_a$ appears on the associated moveable wiper 55. The auxiliary voltage $E_a$ is supplied as the input to a differentiator 51 constituted by a capacitor 56 and a resistor, preferably a rheostat 57, connected in series. The operation of resistance-capacitance differentiating circuits is well known per se in the art, and it will be apparent that when the output and auxiliary voltage $E_o$ and $E_a$ remain constant, the capacitor 56 will have a voltage thereacross equal to the value of the auxiliary voltage $E_a$. Under these conditions, there will be no current flow through the rheostat 57, and the feedback voltage $E_f$ appearing thereacross will be substantially zero. However, when the output and auxiliary voltages $E_o$ and $E_a$ increase or decrease, then the capacitor 56 will charge or discharge by current flow through the rheostat 57, producing a changing voltage $E_f$ across the latter. If it is assumed, for example, that the output and auxiliary voltages $E_o$ and $E_a$ undergo step increases or decreases, the voltage $E_f$ will increase or decrease abruptly (i.e., become positive or negative) and then decay back toward a zero value substantially as a time derivative function in response to the capacitor 56 charging or discharging to the new value of the voltage $E_a$. The time constant represented by the product of the values of the capacitor 56 and the rheostat 57 determines the rate at which this decay in the voltage $E_f$ occurs, and this time constant may be readily adjusted by changing the setting or value of the rheostat 57.

The output voltage $E_f$ of the differentiator 51 is applied as a control voltage across the capacitor-diode 32. More specifically, one end of the rheostat 57 is connected through a current limiting resistor 58 to the upper end of the diode 32, the opposite end of the rheostat 57 and the lower end of the diode 32 both being connected to a common point here shown as ground. Thus, the control voltage $E_c$ is formed by a steady component of about two volts to which the feedback voltage $E_f$ is algebraically added. As the feedback voltage becomes positive or negative in response to the capacitor 56 being charged or discharged, the control voltage $E_c$ is correspondingly increased or decreased.

In general, it will be apparent that the feedback voltage $E_c$ affects the output signal $E_o$ in a negative or degenerative sense. When the output voltage $E_o$ changes, then the effective capacitance of the diode 32 is varied according to the rate of change of the output voltage and in a sense which tends to reduce or partially cancel such change. Because the output voltage $E_o$ normally tends to vary inversely and proportionally according to changes in the temperature error, but the reset feedback circuit produces negative feedback of a time derivative function of the output voltage, the latter voltage thus in part varies as a time integral function of the temperature error.

Operation of FIG. 2

The operation of the system shown in FIG. 2 may now be described with reference to FIGS. 3–6, although it is to be understood that the latter figures are intended to be only generalized approximations to facilitate an understanding of how the present system works.

Figure 6:
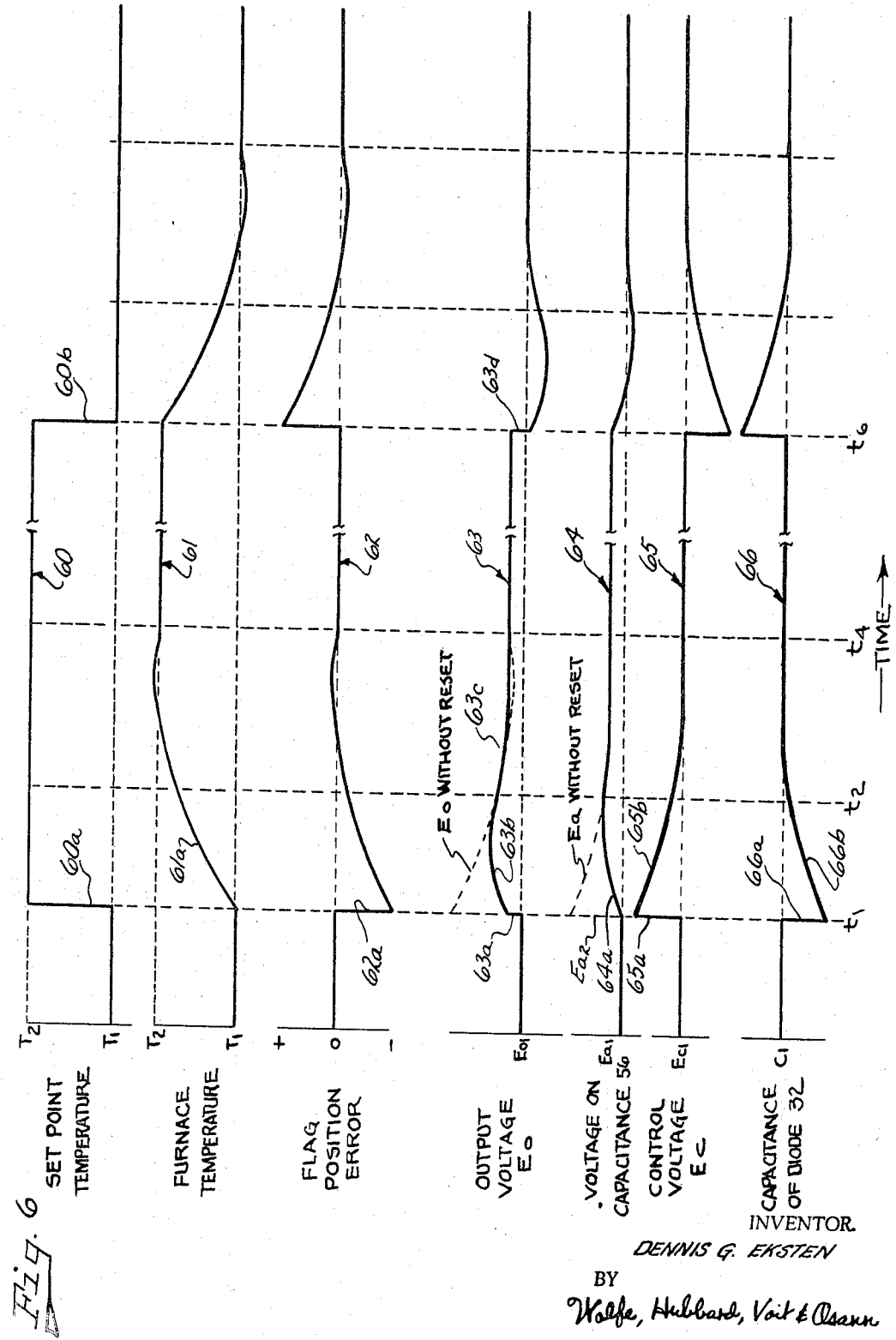
FIG. 6 is an idealized graphical representation of the variations of certain conditions and signals during operation of the control system shown by FIG. 2.

Let it be assumed that prior to the instant $t_1$ in FIG. 6, the system of FIG. 2 is at equilibrium with zero error, i.e., the actual temperature (curve 61) and the set point temperature (curve 60) both having a value $T_1$. The flag 22 is stationary and disposed partially between sections of the coil 30, and the inductance of the latter thus has some intermediate value, so that the variable resonant frequency $f_1$ also has some intermediate value $f_{1a}$ within its possible range of variation. As previously noted, the oscillator 24 is oscillating at a frequency of $f_{0a}$ which is approximately midway between the resonant frequencies $f_{1a}$ and $f_2$. Thus, the detector and the reference tanks 28, 29 are operating at a frequency of $f_{0a}$ which is respectively above and below their resonant frequencies $f_{1a}$ and $f_2$ by an amount $\Delta f_a$. This condition is illustrated at Line A of FIG. 3.

Thus, under these initial conditions, the effective reactances $-X_1$ and $+X_2$ of the detector and reference tanks are respectively capacitive and inductive. It may be seen from FIG. 4 that the magnitude of $-X_{1a}$ is appreciably greater than the magnitude of $+X_{2a}$, and this is illustrated in Line A of FIG. 5. Since the two tank circuits 28, 29 are not series resonant with one another, the amplitude of high frequency current in the oscillator has some value less than its maximum, and the average voltage charge on the blocking capacitor 40 created by emitter-base rectification has an intermediate value. Thus, the D.C. output voltage $E_o$ has some initial value $E_{o1}$ (FIG. 6) which causes the power controller 10 to supply current to the heater 12 at a rate which is just sufficient to balance the thermal losses of the furnace 14' and to hold the temperature of the latter at the equilibrium value $T_1$.

Prior to the instant $t_1$ in FIG. 6, therefore, the flag position error (curve 62) is zero, and the output voltage $E_o$ (curve 63) has an initial steady value $E_{o1}$. The voltage across the capacitor 56 (curve 64) is steady at an initial value approximately equal to the steady voltage $E_a$ (a selected fraction of $E_o$), and the voltage $E_f$ across the rheostat 57 is substantially zero. However, due to the emitter-base rectification previously mentioned, the control voltage $E_c$ (curve 65) across the diode 32 has a steady state value $E_{c1}$ (for example, about two volts). With such initial control voltage $E_{c1}$ applied across it, the diode 32 exhibits a steady state capacitive value (curve 66) here labeled $C_1$.

Figure 3:
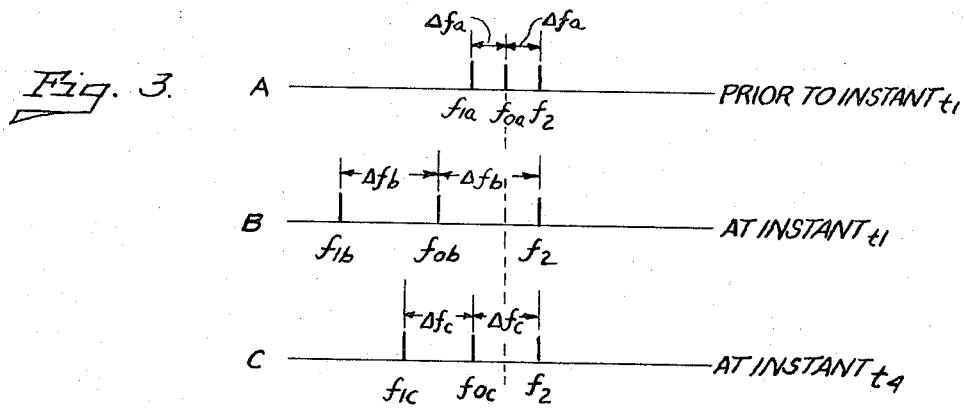
FIG. 3 is a graphical illustration of the relative values of certain resonant frequencies and operating frequencies which obtain in the oscillator of FIG. 2 during different conditions of operation.
Figure 4:
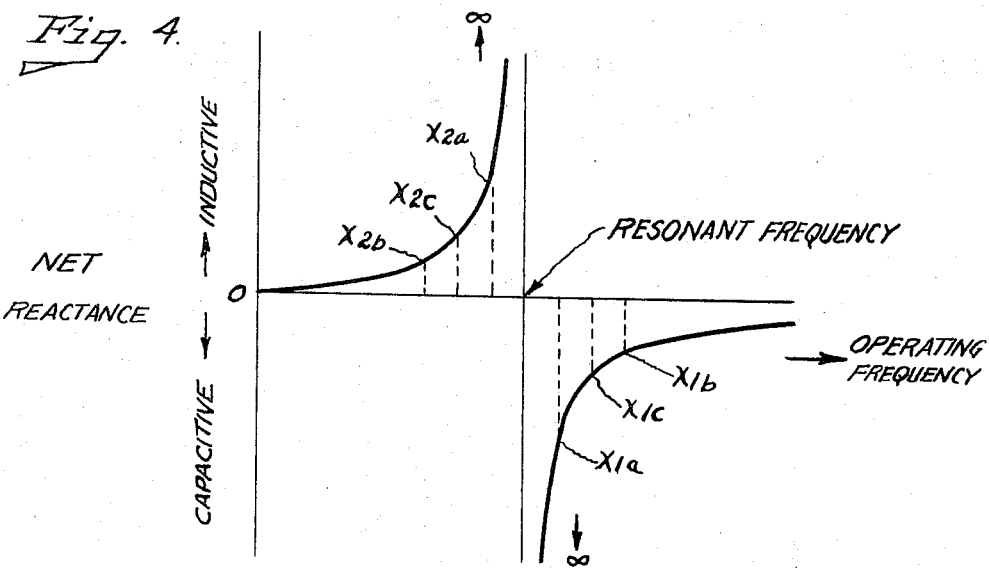
FIG. 4 is a classical graphical representation of the variation in net reactance exhibited by a parallel resonant circuit at different operating frequencies above and below the resonant frequency.
Figure 5:
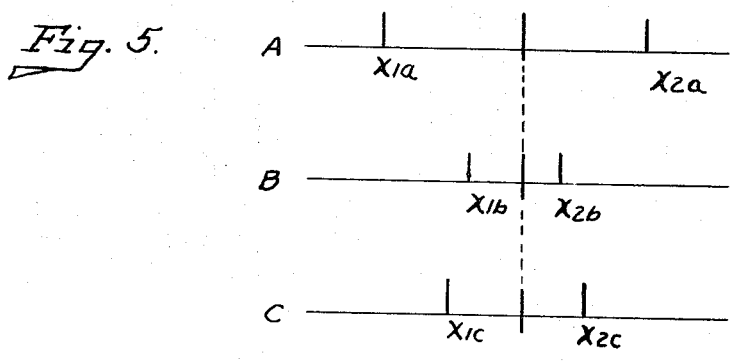
FIG. 5 is a graphical illustrtaion of the relative values of reactances presented by two parallel resonant circuits at different operating frequencies of the oscillator in FIG. 2.

Next, let it be assumed that at the instant $t_1$ the set point (curve 60) is abruptly increased to a higher value $T_2$, by manual up-scale adjustment of the coil 30 to a new position. As a result solely of this displacement:

(a) The flag 22 is displaced out of the coil 30, so that the flag position error increases abruptly in a negative sense, as indicated by curve portion 62a;

(b) The inductance of the coil 30 increases;

(c) The resonant frequency $f_1$ is decreased to a lower value $f_{1b}$, as indicated at line B in FIG. 3;

(d) The operation frequency $f_0$ decreases to a lower value $f_{0b}$, so that the difference in operating and resonant frequencies increases to a greater value $\Delta f_b$, as indicated in line B of FIG. 3;

(e) The reactances $-X_1$ and $+X_2$ both decrease in magnitude;

(f) The two tank circuits 28 and 29 thus appear less nearly series resonant at the operating frequency $f_{0b}$ than at the operating frequency $f_{0a}$, and the amplitude of oscillations decreases, thereby decreasing the average voltage on capacitor 40;

(g) In turn, the D.C. output voltage $E_o$ abruptly increases at the instant $t_1$, as indicated by curve portion 63a; and (h) The power controller 10, therefore, passes increased current to the heater 12 to increase the rate at which heat is generated in the furnace 14', and to cause the temperature of the latter to begin to rise (curve portion 61a).

If no other action took place, the furnace temperature and flag position would both slowly increase at a rate depending upon the thermal inertia or lag of the furnace. The output signal $E_o$ would slowly decrease until the furnace temperature reached a condition of equilibrium. The actual furnace temperature under those conditions might be appreciably displaced or "offset" from the set point temperature $T_2$, this being a known characteristic of proportional control systems.

However, in response to the step increase of the output voltage $E_o$ as shown at curve portion 63a, the auxiliary voltage $E_a$ also abruptly increases, and as a result the capacitor 56 begins to charge by current flow through the rheostat 57 toward a higher value here indicated in curve 64 as $E_{a2}$. The voltage across the capacitor 56 tends to build up exponentially as indicated at curve portion 64a. The charging of the capacitor 65 and the resulting current flow through the rheostat 57 creates a voltage drop $E_f$, across the latter which, when added to the steady state voltage across the diode 32, causes the control voltage $E_c$ to rise abruptly, as indicated at curve portion 65a. The control voltage $E_c$ then decays exponentially as indicated at curve portion 65b. This changing control voltage $E_c$, therefore, makes the exhibited capacitance of the diode 32 abruptly decrease (curve portion 66a) and then gradually increase (curve portion 66b) back toward its original value. The curve 66 is idealized and illustrative only of the general operation, since it is here drawn with the assumption that there is an inverse linear relationship between the control voltage $E_c$ and the diode capacitance. It will be understood that in actual practice this relationship may in most cases be nonlinear. It will also be understood that while exponential variations have been here illustrated and described, they can be made to closely approximate linear variations by appropriately choosing the voltage values and time constants involved.

In response to the above-described variations in the control voltage $E_c$ and the capacitance of the diode 32 (and neglecting for the moment the effect of the flag 22 moving further into the coil 30 as the furnace temperature rises) the following occurs:

(a) The resonant frequency $f_1$ of the detector tank increases abruptly at instant $t_1$ and then begins gradually to decrease;

(b) The oscillation frequency $f_0$ increases and then gradually decreases;

(c) The reactance values $-X_1$ and $+X_2$ become more nearly series resonant, and the amplitude of oscillations increases, but these effects then gradually diminish as the control voltage $E_c$ (curve portion 65b) decays back toward its original value;

(d) The average charge on the blocking capacitor 40 increases abruptly, and then gradually decreases back toward its original value;

(e) The output voltage $E_o$ abruptly falls, and then gradually rises; and (f) The current passed by the power controller 10 abruptly decreases, and then gradually rises.

Now it is to be remembered that the effects of flag movement relative to the coil 30 (as a result of increasing the set point and thereafter as the furnace temperature increases) and the effect of the changing voltage $E_c$ across the diode 32 occurs simultaneously, and each one of these has an influence on the other. Accordingly, FIG. 6 illustrates the net effect of these changes during the interval between time instants $t_1$ and $t_2$. It will be seen that the output voltage $E_o$ does not jump (at curve portion 63a) as much as it otherwise would with an open loop connection, because the effect of the capacitance decrease illustrated at curve portion 66a tends to produce a negative change in the output voltage. Thus, the gain of the system is prevented from increasing to such a high value as to cause instability, and yet it is initially sufficiently high for strong corrective action. Then, after the output voltage $E_o$ has increased as indicated at curve portion 63a, it may continue to rise slowly (curve portion 63b) by virtue of the fact that the capacitance of the diode 32 is increasing slowly at curve portion 66b, and the tendency of the diode to decrease the output voltage is diminishing. Thus, the initial rate of temperature increase (curve portion 61a) is not as great as it otherwise would be if the variable capacitance constituted by the diode 32 were not being controlled by the time derivative voltage $E_c$.

In overall effect, therefore, the output voltage $E_o$ (curve 63) varies substantially as the sum of two component variations, namely, (1) a component which varies according to the magnitude of the sensed temperature error, and (2) a component which varies as the time integral of the temperature error. The latter integration effect is achieved by closed loop negative feedback of a signal which varies as a time derivative function of the output voltage $E_o$. As previously explained, the control voltage $E_c$ changes as a time derivative function of the output voltage $E_o$ and in a direction which tends to cancel or reduce changes in the output voltage $E_o$.

After the instant $t_2$, the effect of the changing control voltage $E_c$ continues, but it is now relatively small. The flag 22, in progressively advancing into the coil 30 as the furnace temperature rises, tends to decrease the output voltage $E_o$ with a relatively small rate of change (curve portion 63c) so that the rate of heating in the furnace 14' is decreased until at instant $t_4$ it reaches a new steady state value with the furnace temperature (curve 61) stabilized at the desired value $T_2$. By the time equilibrium is reached, the flag 22 is stationary but projects into the coil very slightly less than prior to the instant $t_1$. For practical purposes, offset has been reduced to an insignificant level. Thus, the resonant frequency $f_1$ at instant $t_4$ has increased to a value $f_{1c}$ (line C of FIG. 3) which is slightly less than the original value $f_{1a}$, and the oscillator is operating at a frequency $f_{0c}$. The tank circuits are now operating off-resonance by a frequency difference $\Delta f_c$, and the difference between the magnitudes of their respective reactances $-X_{1c}$ and $+X_{2c}$ (see FIG. 4 and line C, FIG. 5) is reduced to a value very slightly greater than the difference between the original reactance values $-X_{1a}$ and $+X_{2a}$. The tank circuits 28, 29 are thus displaced slightly more from series resonance with each other, the strength of oscillations is less, and the output voltage $E_o$ is slightly greater than it was prior to instant $t_1$. Therefore, after instant $t_4$ the controller supplies current to the heater at a higher level to make up for the greater furnace heat losses at the higher equilibrium temperature $T_2$.

The operation described occurs in a reverse sense if the set point temperature is abruptly decreased from $T_2$ to $T_1$, as indicated at curve portion 60b and at some later time instant $t_6$. In this case, the output voltage $E_o$ drops abruptly as shown by curve poriton 63d, and then varies as an integral function of the temperature error. It is not believed necessary to describe the right portion of FIG. 6 in greater detail, since it represents simply an operation which is the reverse of that which is illustrated by the left portion of the figure.

For a given change in the auxiliary voltage $E_a$, the rate at which the voltage $E_f$ changes depends upon the time constant of the differentiator 51. Thus, the reset rate may readily be adjusted by changing the time constant of the differentiator circuit 56, 57. As here shown, it is only necessary to adjust the simple and standard rheostat 57 to change the reset rate to a value which best matches the particular furnace and heater (or other final device) being controlled.

The proportional band of the composite proportional plus reset system is the change in temperature required to swing the control voltage $E_o$ between its maximum and minimum values, i.e., to swing the power controller 10 between "full on" and "full off" conditions, when the error variations are occurring in the middle range of frequencies. At these relatively high frequencies, the capacitor 56 appears substantially as a short circuit, and the gain of the transducer is determined by the feedback voltage $E_c$. The width of the proportional band affects the stability of systems having furnaces or other control devices with different lags or thermal inertias. The desirable flexibility for adjusting the proportional band so as to effect stable control with any of several different types and kinds of controlled devices is here achieved simply by the use of the potentiometer 54 which permits adjustment of the coefficient of the negative feedback. As the ratio of the voltages $E_a$ and $E_o$ is increased or decreased, the proportional band width is increased or decreased because the effect of a large change in temperature error will produce a smaller or greater degenerative effect on the output voltage $E_o$. In other words, the total gain of the system for mid-range frequency errors depends upon the setting of the potentiometer 54 and the ratio of the voltages $E_a$ and $E_o$.

*Modified embodiments providing rate or rate plus reset action*

As thus far described with reference to FIGS. 1–6, the system here disclosed operates with proportional plus reset action. Where proportional plus rate action is desired, it may be accomplished by a relatively simple structural modification of the circuit of FIG. 2, such modification being shown in FIG. 7 wherein like reference characters are used to identify like parts. Stated briefly, the embodiment of FIG. 7 may be exactly like that of FIG. 2, except that the differentiator 51 of the latter is replaced by an alternative circuit 51A in the former. For this reason, only the oscillator 24 of FIG. 2 is reproduced in FIG. 7, it being understood that other components will be associated with the oscillator in the manner illustrated by FIG. 2.

For the purpose of providing rate action in the embodiment of FIG. 7, feedback means are employed to vary the effective reactance of the voltage-controlled impedance, i.e., the diode 32, in a manner which causes the output signal $E_o$ to include a component which varies as the first time derivative of the sensed error. To accomplish this, a negative feedback signal is created which varies as a time integral function of the output signal $E_o$, and such signal is applied as a control voltage $E_c$ across the diode 32.

As here illustrated, the voltage $E_a$, which constitutes a selected fraction of the output voltage $E_o$, is applied to the input of an integrator 51A, and the output of the latter appearing on a conductor 70 is applied across the variable capacitance diode 32. Specifically, the integrator 51A includes a resistance-capacitance circuit formed by a rheostat 71 and a capacitor 72 connected in series across the auxiliary voltage $E_a$. That is, the resistor 71 is connected to the wiper 55 and through the capacitor 72 to a point of ground potential.

As the auxiliary voltage $E_a$ increases or decreases, the capacitor 72 will charge or discharge through the resistor 71. The voltage $E_g$ appearing across the capacitor 72, and thus at point P1, will vary with a time lag according to variations in the auxiliary voltage $E_a$, and the voltage $E_g$ will therefore vary as a time integral of the output voltage $E_o$.

The voltage $E_g$ appearing at point P1 is connected in series through a compensating voltage source, here shown as a battery 74, and through the current limiting resistor 58 to the cathode of the variable-capacitance diode 32. The battery 74 is employed to produce a compensating voltage $E_b$ of the indicated polarity so that the feedback voltage $E_h$ appearing on the output line 70 may swing either positive or negative as the voltage $E_g$ increases or decreases from a mid-point value. The battery 74 provides a bias which cancels the mid-point value of the voltage $E_a$, while nevertheless transmitting the difference between the voltage $E_a$ and battery voltage $E_b$ to the diode 32, and assuming that the latter is always biased reversely. The feedback voltage $E_h$ thus may either increase or decrease the control voltage $E_c$ relative to the normal steady bias (e.g., about two volts) which that control voltage otherwise has.

In the operation of FIG. 7, it may be considered first that if the capacitor 72 were absent, then the voltage at point P1, the feedback voltage $E_h$, and the control voltage $E_c$ would vary directly and in phase with variations of the output voltage $E_o$. A tendency of the output voltage $E_o$ to increase would thus tend to increase the control voltage $E_c$, tend to decrease the effective capacitance of the diode 32, tend to increase the resonant frequency $f_1$ of the detector tank circuit 28, and in the manner previously explained, tend to reduce the output voltage $E_o$. In other words, there is a negative feedback connection which normally holds the gain of the transducer 24 to a value less than its open loop gain.

Now, with the capacitor 72 present as shown, the voltage $E_g$ thereacross varies as the time integral of the output voltage $E_o$. That is, the voltage $E_g$ and the potential at point P1 lags behind any change in the voltage $E_a$, but approaches the value of $E_a$ when the latter approaches a steady state value. Therefore, when the output voltage $E_o$ increases suddenly the voltage at point P1 does not correspondingly increase suddenly. In effect, therefore, the negative feedback action is temporarily decreased, the gain of the transducer is temporarily increased, and the output voltage $E_o$ is made temporarily greater than it otherwise would be. On the other hand, if the output voltage $E_o$ suddenly decreases, the voltage at point P1 tends to remain at its original value, and thus the output voltage $E_o$ is reduced relative to the value which it would otherwise have.

In overall effect, therefore, the integrator 51A creates a voltage $E_h$ which varies as a first (integral) time function of the output voltage $E_o$, but the negative feedback action produced by application of this voltage as a control signal for the diode 32 causes the output voltage to have a component variation which is a second, inverse (i.e., derivative) time function of the changes in the output voltage. Since changes in the output voltage $E_o$ are caused by changes in the sensed temperature error, the output signal $E_o$ has one component which varies in proportion to the error, and another component which varies substantially as the rate or first time derivative of the error. When the error is increasing or decreasing, the output voltage $E_o$ will be greater or less than it otherwise would be, and by an amount which is proportional to the rate of change of error. This action is known in the art as "rate action" or "derivative action."

The rate factor, i.e., the relationship between the rate of change of error and the resultant derivative component of the output voltage $E_o$, is determined by the R-C time constant of the integrator 51A. As here shown, this time constant ($R_{71} \times C_{72}$) and the rate factor may be adjusted for best performance with any particular system being controlled simply by changing the effective value of the rheostat 71.

FIG. 8 corresponds to a portion of FIG. 7 and illustrates a third embodiment for producing proportional action plus both reset and rate action. Because all of the apparatus of this embodiment, except a modified circuit 51B, is identical to that described previously with reference to FIG. 2 or FIG. 7, FIG. 8 shows only the modified parts and their connections to the transducer or oscillator 24.

To provide both rate and reset action, the circuit of FIG. 8 includes an integrator-differentiator 51B which produces a first signal varying as a time integral of the output voltage $E_o$, and a second signal varying as a time derivative of the output voltage $E_o$. Both signals are, in effect, added and applied as a control voltage to the voltage-controlled capacitive diode 32. By correlation of the time constants of integration and differentiation, the two signals may be made not simply to cancel one another, but instead the first signal may predominate initially upon a sudden change in required output and the second signal may predominate later.

As here shown, the integrator-differentiator 51B comprises an R-C integrator formed by the rheostat 71, capacitor 72, and a second rheostat 73 connected in series and energized by the auxiliary voltage $E_a$ which appears at the wiper 55. The rheostat 73 is sized to present a low resistance in relation to the value of the rheostat 71; its presence may be neglected except when the frequency of the output signal variations is high and the capacitor 72 presents a negligible impedance. Under those conditions the rheostats 71 and 73 in effect constitute a voltage divider which makes the voltage at point P1 approach a selected fraction of the voltage $E_a$, thereby determining the high frequency feedback ratio and the high frequency gain of the transducer or oscillator 24.

From what has been said before, the voltage $E_g$ appearing across capacitor 72, and thus the first signal appearing at point P1, will vary at a time integral function of the output voltage $E_o$. This first voltage is applied across an R-C differentiator constituted by the capacitor 56 and rheostat 57. A net feedback voltage $E_j$ therefore appears across the rheostat 57 and on the output conductor 70, this feedback voltage varying as the time derivative of changes in voltages appearing at point P1.

The time constant of the integrator 71, 72, 73 is usually made low in comparison to the time constant of the differentiator 56, 57. This means that at low error frequencies, the signal $E_j$ will vary predominately as the time derivative of the output voltage $E_o$, and at high error frequencies it will vary predominately as the time integral of the output voltage. The feedback signal $E_j$ is applied as a component of the control voltage $E_c$ across the diode 32 to produce the negative feedback action previously described herein. Thus, at low frequencies the output voltage $E_o$ will have a strong component which varies as the integral of the sensed temperature error; and at high error frequencies the output voltage will have a strong component which varies as the derivative of the sensed temperature error. Both reset and rate action are in this way produced, the former predominating at low error frequencies and the latter predominating at high error frequencies.

It will be seen that the arrangement of FIG. 8 is especially advantageous because the capacitor 56 which forms a part of the differentiator circuit provides D.C. isolation between the point P1 and the output conductor 70. It is unnecessary to employ a compensating voltage source such as the battery 74 in FIG. 7. Under steady state conditions, when the point P1 is at a voltage corresponding to the steady voltage $E_a$, the capacitor 56 is charged to this same voltage, and the feedback signal $E_j$ is zero.

In combined circuit 51B of FIG. 8, the proportional band of the system is readily adjusted by setting the wiper 55; the reset rate is readily adjusted by setting the rheostat 57, and the rate factor is readily adjusted by setting the rheostats 71 and 73, the latter preferably being ganged together so that rate gain is not appreciably changed as such adjustments are made.

In view of the foregoing, it will now be apparent that the present controller is one which is quite simple in its organization and operation, and susceptible of compact and economical construction. By virtue of negative feedback of either or both a time derivative function or a time integral function to the controllable reactance diode 32, either or both reset and rate action is obtained, and with the reset rate, the rate action gain, and the proportional band being adjustable through the provision of simple and inexpensive potentiometers or rheostats.

I claim as my invention:

1. In a control system for supplying energy to an energy-utilization device at a rate proportional to an output signal and thereby to control the value of a variable condition, the combination comprising means for signalling the actual value of the variable condition, a transducer responsive to said signalling means and including first means for producing an output signal which normally varies in proportion to the error between said actual value and a set point, said transducer including second means non-responsive to said signalling means for altering the output signal, said second means including a voltage-controlled variable impedance and means responsive to the impedance value thereof for affecting the magnitude of said output signal, and means connected to receive said output signal and responsive thereto for applying across said impedance a control voltage whcih varies as a first time function of said output signal, thereby to alter said output signal as a second, inverse time function of said error.

2. In a control system for supplying energy to an energy-utilization device at a rate proportional to an output signal and thereby to control the value of a variable condition, the combination comprising means for signalling the actual value of the variable condition, a transducer having a tuned circuit formed by a variable inductance connected in parallel with a variable capacitance, and including means for producing an output signal which normally varies according to changes in the resonant frequency of said tuned circuit, means responsive to said signalling means for varying the value of said inductance so that said output signal normally varies in proportion to the error between said actual value and a set point, said capacitance including a voltage-controlled variable capacity diode, adjustable means to derive from said output signal an auxiliary signal equal to a selectable fraction of the latter, and means for applying across said variable capacity diode a control voltage which varies as a first time function of said auxiliary signal, thereby to alter said output signal as a second, inverse time function of said error, the proportional band of the system being determined by the setting of said adjustable means.

3. In a proportional and reset control system for supplying energy to an energy-utilization device at a rate proportional to an output signal and thereby to control the value of a variable condition, the combination comprising means for signalling the actual value of the variable condition, a transducer having a variable inductance and a variable capacitance together with means to produce an output signal which varies with changes in said inductance and which also varies with changes in said capacitance, means responsive to said signalling means for varying the value of said inductance so that said output signal normally varies in proportion to the error between said actual value and a set point, said capacitance including a voltage-controlled variable capacity element, a differentiator responsive to said output signal for producing a control voltage which varies as a time derivative function of said output signal, and means for applying said control voltage across said variable capacity element thereby to alter said output signal as a time integral function of said error.

4. In a system for supplying energy to an energy-utilization device at a rate proportional to an output signal and thereby to control the value of a variable condition, the combination comprising, means for signalling the actual value of the variable condition, an oscillator having a variable inductance and a variable capacitance whose values jointly determine the amplitude of oscillations, said oscillator including means for producing a variable DC output signal which changes in magnitude when the amplitude of oscillations changes, means responsive to said signalling means for varying said inductance so that said output signal normally varies in proportion to the error between the actual value and a set point, said variable capacitance including a voltage-controlled variable capacity element, and means connected to receive and responsive to said DC output signal for applying across said element a control voltage which varies as a time function of said output signal, thereby to alter said output signal as a time function of said error.

5. In a system for supplying energy to an energy utilization device at a rate proportional to an output signal and thereby to control the value of a variable condition, the combination comprising an oscillator having at least one tuned circuit formed by parallel-connected inductive and capacitive elements and including means for producing an output signal which varies in magnitude according to changes in the resonant frequency of such tuned circuit, first means for varying the value of an inductive element in a tuned circuit of the oscillator in accordance with changes in the error between the actual and set point values of said condition so that said output signal is normally proportional to the error, second means for varying the resonant frequency of a tuned circuit in the oscillator, said second means including a voltage-controlled variable capacitive element connected in said tuned circuit and influencing the resonant frequency thereof, and means connected to receive and responsive to said output signal for applying across said variable capacitance element a DC voltage which varies as a time function of said output signal, thereby to alter said output signal as a time function of said error.

6. In a system for supplying energy to an energy-utilization device at a rate proportional to an output voltage and thereby to control the value of a variable condition, the combination comprising an oscillator having at least one tuned circuit and means for producing a DC output voltage which normally varies in magnitude according to changes in the resonant frequency of such tuned circuit, a variable inductive element connected to form a part of a tuned circuit in said oscillator, means for varying the inductance of said inductive element according to changes in the error between actual and set point values of the variable condition so that said output signal is normally substantially proportional to such error, a voltage-controlled variable capacitive element connected to form a part of a tuned circuit in said oscillator, and means connected to receive and responsive to said output signal for applying across said capacitive element a DC control voltage which varies as a time function of the oscillator output voltage, thereby to alter the output voltage as a time function of the error.

References Cited

UNITED STATES PATENTS

| | | | |
|---|---|---|---|
| 2,724,040 | 11/1955 | Moozon | 219—494 |
| 2,898,436 | 8/1959 | Lawler | 219—506 X |
| 2,947,875 | 8/1960 | Beck | 219—501 X |
| 2,956,234 | 10/1960 | Olsen | 323—66 X |
| 2,974,237 | 3/1961 | Ehret | 219—501 |
| 3,021,492 | 2/1962 | Kaufman | 331—36 |
| 3,050,693 | 8/1962 | Sinninger | 331—36 |

JOHN F. COUCH, *Primary Examiner.*

A. D. PELLINEN, *Assistant Examiner.*